(12) United States Patent
I et al.

(10) Patent No.: US 8,926,246 B2
(45) Date of Patent: Jan. 6, 2015

(54) BOLT SUPPORT STRUCTURE

(75) Inventors: Sunsoku I, Makinohara (JP); Hiroaki Yamada, Makinohara (JP)

(73) Assignee: Yazaki Corporation, Tokyo (JP)

( * ) Notice: Subject to any disclaimer, the term of this patent is extended or adjusted under 35 U.S.C. 154(b) by 84 days.

(21) Appl. No.: 13/559,660

(22) Filed: Jul. 27, 2012

(65) Prior Publication Data

US 2013/0028683 A1   Jan. 31, 2013

(30) Foreign Application Priority Data

Jul. 28, 2011  (JP) ................................. 2011-165617

(51) Int. Cl.
    *F16B 39/00*  (2006.01)
(52) U.S. Cl.
    USPC ........................... 411/166; 411/107; 439/801
(58) Field of Classification Search
    None
    See application file for complete search history.

(56) References Cited

U.S. PATENT DOCUMENTS

| | | | | |
|---|---|---|---|---|
| 4,056,301 A | * | 11/1977 | Norden | 439/724 |
| 4,850,063 A | * | 7/1989 | Abbate | 4/252.1 |
| 5,203,716 A | * | 4/1993 | Martucci et al. | 439/411 |
| 5,823,727 A | * | 10/1998 | Lee | 411/85 |
| 6,235,073 B1 | * | 5/2001 | Bannister et al. | 55/385.3 |
| 6,238,132 B1 | * | 5/2001 | Plantan et al. | 403/343 |
| 6,322,376 B1 | * | 11/2001 | Jetton | 439/76.2 |
| 7,784,857 B2 | * | 8/2010 | Naik et al. | 296/193.1 |
| 7,931,479 B1 | * | 4/2011 | De La Reza et al. | 439/76.2 |
| 2009/0232616 A1 | * | 9/2009 | Sekreta et al. | 411/107 |
| 2011/0094767 A1 | * | 4/2011 | Asao | 174/50 |

FOREIGN PATENT DOCUMENTS

JP          06-276648 A          9/1994

\* cited by examiner

*Primary Examiner* — Gary Estremsky
(74) *Attorney, Agent, or Firm* — Edwards Wildman Palmer LLP

(57) ABSTRACT

There is provided a bolt support structure which can absorb displacement of a bus bar and prevent the bus bar from bending during fastening of bolt, having a bolt including a head portion and a shaft portion and a mount portion to which the head portion is mounted movable in an axial direction of the shaft portion. The mount portion includes a bottom and upper plates between which a large-diameter portion of the head portion is positioned. The shaft portion and a small-diameter portion of the head portion are passed through a notch of the upper plate. A gap between the bottom and upper plates is larger than the thickness of the large-diameter portion. After the head portion is mounted to the mount portion, the nut is attached to the shaft portion so that the bus bar and the terminal clamp are sandwiched between the head portion and the nut.

1 Claim, 10 Drawing Sheets

BOLT SUPPORT STRUCTURE

CROSS REFERENCE TO RELATED APPLICATIONS

This application is on the basis of Japanese Patent Application No. 2011-165617, the contents of which are hereby incorporated by reference.

TECHNICAL FIELD

The present invention relates to a bolt support structure for attaching a bolt to a frame and such of an electrical junction box, the bolt being provided for fixing a bus bar and a terminal clamp together to electrically connect the bus bar with the terminal clamp.

BACKGROUND ART

FIGS. 7 through 10 show cross-sectional view of a conventional bolt support structure provided to an electrical junction box. Such electrical junction box is mounted to a motor vehicle for supplying electricity and transmitting signals to electronic equipments mounted to the motor vehicle.

The bolt support structure 201 described above includes, as shown in FIG. 7, a bolt 202 having a head portion 220 and a shaft portion 223 and a mount portion 203 to which the head portion 220 is mounted. As shown in FIG. 8, the bolt 202 is arranged to fix a connection portion 40 provided at a bus bar 4 with a connection portion 50 provided at a terminal clamp connected to an end of a power source wire for electrically connecting the connection portion 40 with the connection portion 50. The mount portion 203 is made of synthetic resin and is formed integrally or separately with a frame 211 of the electrical junction box.

For the bolt 202 described above, the head portion 220 is implanted within the resin forming the mount portion 203 such that the shaft portion 223 projects out from an outer surface of the mount portion 203. Furthermore, the bolt 202 is mounted to the mount portion 203 so as to prohibit the bolt 202 from moving with respect to the mount portion 203 in an axial direction of the shaft portion 223.

The bus bar 4 described above is formed by pressing a metallic plate. The bus bar 4 is provided with a plurality of connection portions (not shown) which is electrically connected with an electronic component and the connection portion 40 which is electrically connected with the above-described connection portion 50 of the terminal clamp. This connection portion 40 of the bus bar 4 is formed by bending an end of the bus bar 4 at a right angle and is provided with a through hole 41 through which the shaft portion 223 of the bolt is passed.

The connection portion 50 of the terminal clamp is formed into a flat plate shape and is provided with a through hole 50a through which the shaft portion 223 of the bolt 202 is passed.

Referring to FIG. 8, for the electrical junction box having the above-described bolt support structure 201, first the head portion 220 of the bolt 202 is mounted to the mount portion 203, and then the shaft portion 223 is subjected to sequentially passed through the through hole 41 of the bus bar 4, the through hole 50a of the terminal clamp and a washer 7. Then, a nut 8 is screwed to the shaft portion 223, thereby fixing and electrically connecting the connection portion 40 of the bus bar 4 with the connection portion 50 of the terminal clamp (refer for example to Japan Patent Application Publication H06-276648).

The drawback in the electrical junction box having the above-described bolt support structure 201 is described below. That is, the bus bar 4 is designed to be mounted on the frame 211 of the electrical junction box so that the connection portion 40 of the bus bar 4 is in contact with an outer surface of the mount portion 203; however, in practice, the connection portion 40 may sometimes lift up and detach from the outer surface of the mount portion 203, as shown in FIG. 9. Thus, when the connection portion 50 of the terminal clamp is attached onto this connection portion 40 shown in FIG. 9 and the nut 8 is attached to the shaft portion 223, it causes the connection portion 40 to bend, producing a concentrated stress at a bent portion F. In addition, such concentrated stress on the bent portion F caused by the bending of the connection portion 40 causes a damage to the bus bar 4 as well as defective attachment between the bolt 202 and the nut 8 which is not desirable.

SUMMARY OF INVENTION

In view of the above-described drawback, it is an object of the present invention to provide a bolt support structure which can absorb displacement of a bus bar and which can prevent the bus bar from bending during fastening of a bolt.

In order to achieve the above-described object, the present invention provides, according to a first aspect, a bolt support structure having a bolt including a head portion and a shaft portion and a mount portion to which the head portion of the bolt is mounted, wherein after the head portion of the bolt is mounted to the mount portion, a nut is attached to the shaft portion of the bolt so as to sandwich a bus bar and a terminal clamp between the head portion of the bolt and the nut, wherein the head portion of the bolt is mounted to the mount portion so as to move in an axial direction of the shaft portion with respect to the mount portion.

According to the first aspect of the present invention described above, since the head portion of the bolt is mounted to the mount portion so as to move in the axial direction of the shaft portion with respect to the mount portion, the displacement of the bus bar can be absorbed and the bus bar can be prevented from bending during fastening of the bolt.

Furthermore, according to a second aspect of the present invention, there is provided the bolt support structure wherein the head portion of the bolt is composed of a large-diameter portion and a small-diameter portion, the mount portion includes a bottom plate and an upper plate arranged to position an outer periphery portion of the large-diameter portion between the upper plate and the bottom plate, the shaft portion and the small-diameter portion are passed through a notch formed at the upper plate of the mount portion, and a gap between the bottom plate and the upper plate of the mount portion is formed larger than the thickness of the outer periphery portion of the large-diameter portion.

According to the second aspect of the present invention described above, the displacement of the bus bar can be absorbed and the bus bar can be prevented from bending during fastening of the bolt. Furthermore, the bottom plate of the mount portion can serve to receive the force applied by a fastening jig in a downward direction along the axial direction of the bolt during fastening of the bolt.

DESCRIPTION OF EXEMPLARY EMBODIMENTS

Figure 1:
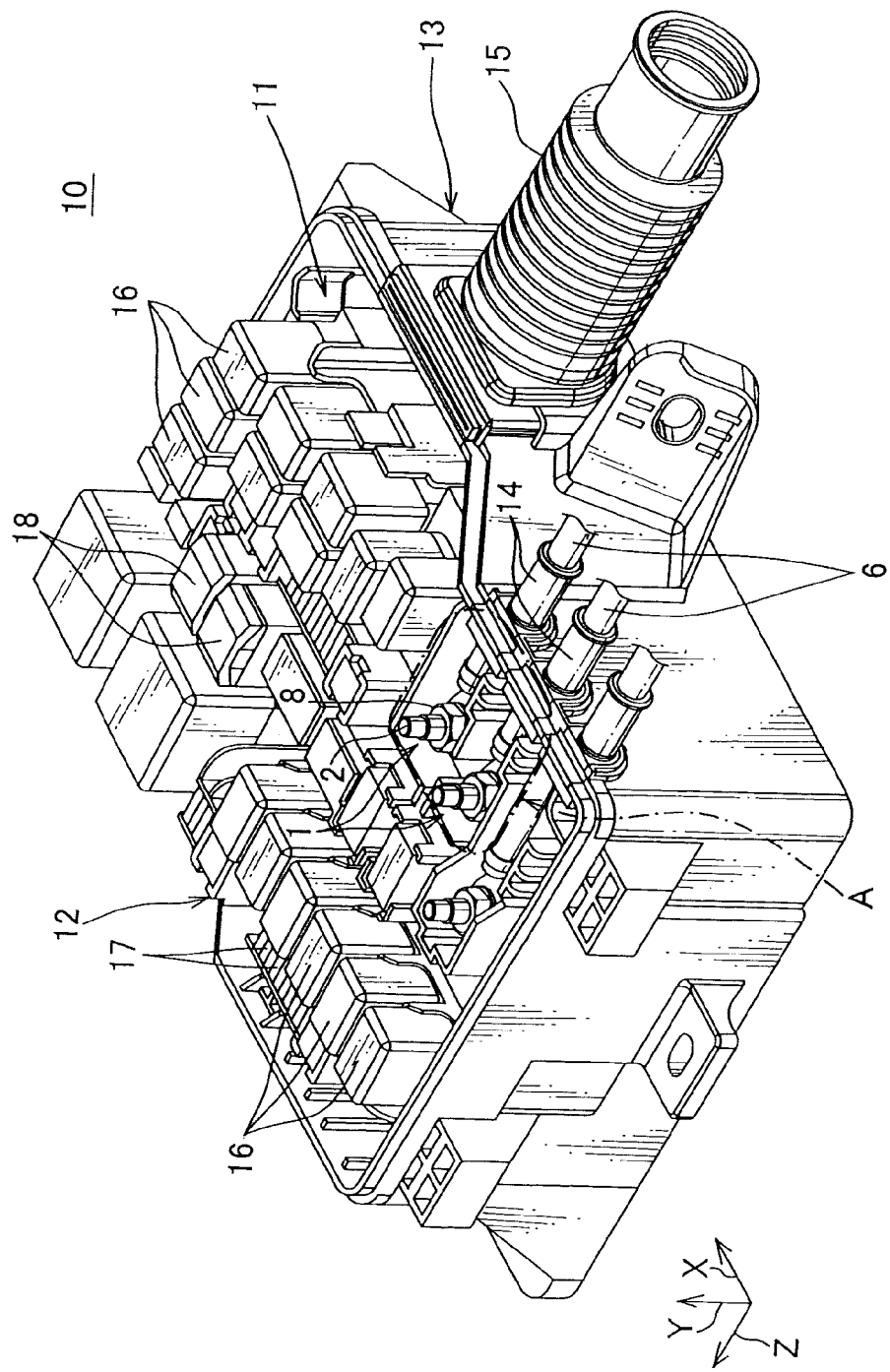
FIG. 1 is a perspective view of an electrical junction box employing a bolt support structure according to one embodiment of the present invention.

A bolt support structure 1 according to one embodiment of the present invention is explained below in reference with FIGS. 1 through 6. As shown in FIG. 1, the bolt support structure 1 is provided to an electrical junction box 10. The electrical junction box 10 is mounted to a motor vehicle for supplying electricity and transmitting signals to electronic equipments mounted within the motor vehicle. The term "electrical junction box" used herein collectively means a junction block or box, a fuse block or box and a relay block or box.

The electrical junction box 10 described above includes a plurality of electronic components 16, 17, 18, a plurality of bus bars 4 as a wiring member, a cassette block 11, 12 made of synthetic resin and to which the electronic components 16, 17, 18 and the bus bar 4 are mounted, a body case 13 receiving the cassette block 11, 12, an upper cover (not shown) covering an upper face of the body case 13, a grommet 14 attached to a circumference of a power source wire 6 extending into the body case 13 so as to make the body case 13 watertight, a grommet 15 attached to a circumference of a bundle of electric wires of a wire harness (not shown) drawn outside of the body case 13 so as to make the body case 13 watertight, and a bolt 2 attached to a mount portion 3 formed integrally with the cassette block 11.

Figure 2:
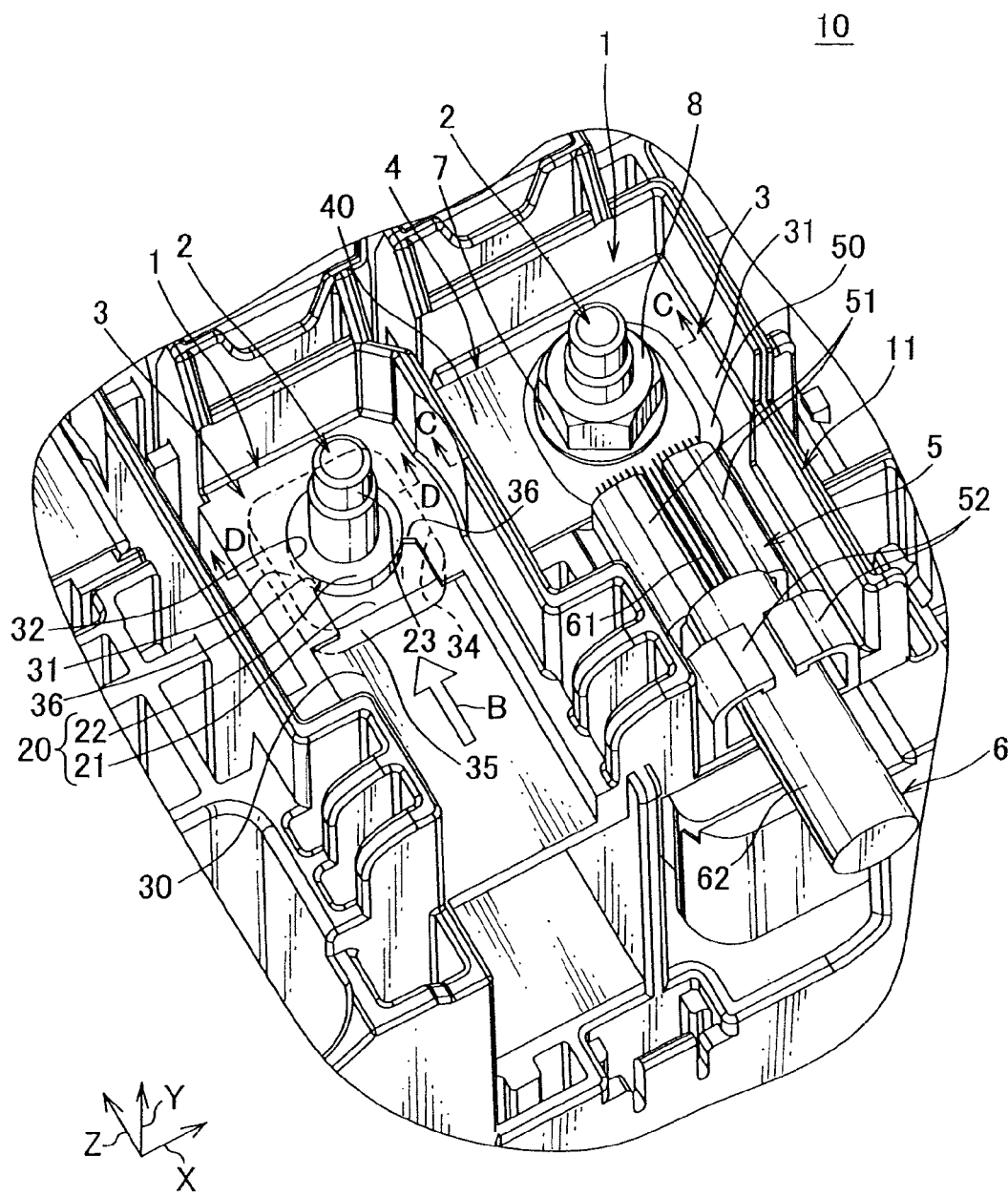
FIG. 2 shows detail of a portion A shown in FIG. 1.

As shown in FIG. 2, the bolt support structure 1 includes the bolt 2 having a head portion 20 and a shaft portion 23, and the mount portion 3 to which the head portion 20 is mounted. A connection portion 40 provided at the bus bar 4 and a connection portion 50 provided at a terminal clamp 5 connected to an end of a power source wire 6 are fixed to each other by the bolt 2 and electrically connected to each other. In FIG. 2, there are shown two bolt support structures 1. In order to explain the detailed structure of the mount portion 3, the bus bar 4, the terminal clamp 5, the power source wire 6, a washer 7 and a nut 8 are eliminated for one of the two bolt structures.

The bus bar 4 may be formed by pressing a metallic plate. The bus bar 4 includes a plurality of connection portions (not shown) to be electrically connected to the electronic components 16, 17, 18 and the connection portion 40 to be electrically connected to the connection portion 50 of the terminal clamp 5. The connection portion 40 of the bus bar 4 is formed by bending an end of the bus bar 4 at a right angle and is provided with a through hole 41 through which the shaft portion 23 of the bolt 2 is passed.

The terminal clamp 5 may be formed by pressing a metallic plate. As shown in FIG. 2, the terminal clamp 5 includes a pair of pressure-bonding pieces 51 to which a core wire 61 of the power source wire 6 is pressure bonded, a pair of pressure-bonding pieces 52 to which an insulating cover 62 of the power source wire 6 is pressure bonded, and the above-described connection portion 50. The connection portion 50 of the terminal clamp 5 is formed into a flat plate having a circular planar shape and is provided with a through hole 50a through which the shaft portion 23 of the bolt 2 is passed.

As shown in FIG. 2, the head portion 20 of the bolt 2 has a large-diameter portion 21 and a small-diameter portion 22. The large-diameter portion 21 is formed into a flat plate having a substantially square planar shape. The small-diameter portion 22 is formed into a flat plate having a circular planar shape. The length of a side of an outer periphery portion of the large-diameter portion 21 is formed larger than the diameter of the small-diameter portion 22. Furthermore, the small-diameter portion 22 is arranged between the large-diameter portion 21 and the shaft portion 23. The large-diameter portion 21, the small-diameter portion 22 and the shaft portion 23 are arranged coaxially.

Figure 3:
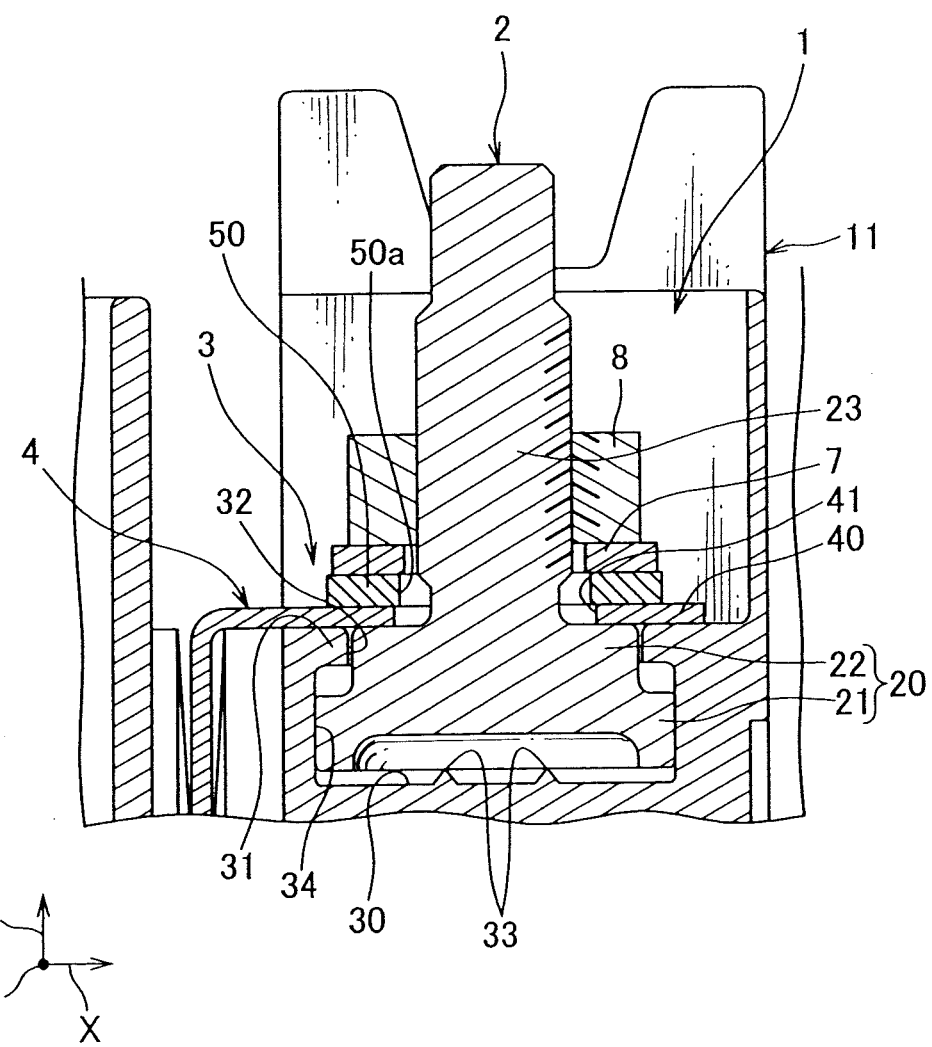
FIG. 3 is a cross-sectional view taken along a line C-C shown in FIG. 2.

As shown in FIGS. 2 and 3, the mount portion 3 includes a bottom plate 30, a U-shaped side plate 34 extending perpendicularly from an outer periphery portion of the bottom plate 30, an upper plate 31 formed continuous with the side plate 34 and arranged opposite to the bottom plate 30 so as to locate the outer periphery portion of the large-diameter portion 21 between the upper plate 31 and the bottom plate 30, and an opening 35 formed at a location where the side plate 34 is not formed. The upper plate 31 includes a notch 32 through which the shaft portion 23 and the small-diameter portion 22 are passed and a pair of projections 36 projecting from an inner periphery of the notch 32 towards each other. The notch 32 is arranged to open into the opening 35. The pair of projections 36 is arranged adjacent to the opening 35. Furthermore, the gap between the pair of projections is formed smaller than the diameter of the small-diameter portion 22. The gap between the bottom plate 30 and the upper plate 31 is formed larger than the thickness of the outer periphery portion of the large-diameter portion 21.

Figure 4:
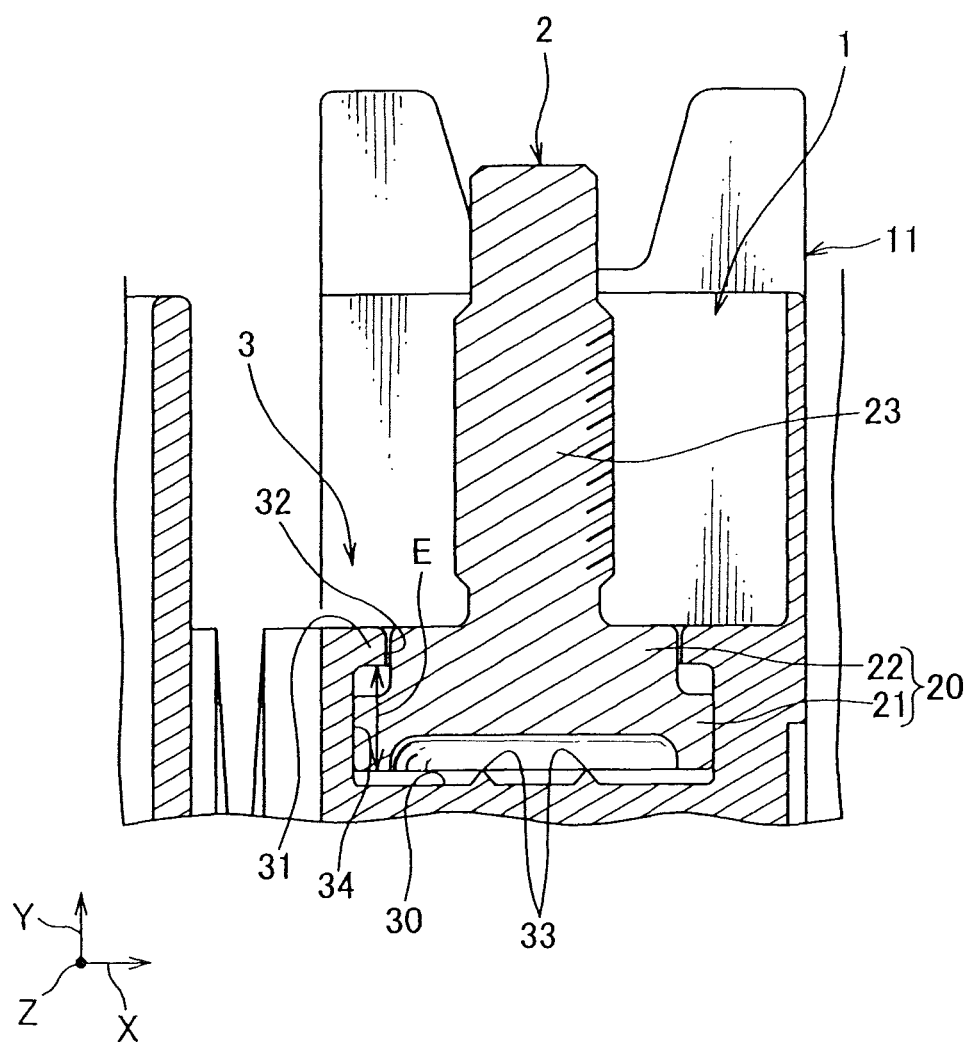
FIG. 4 is a cross-sectional view taken along a line D-D shown in FIG. 2.
Figure 5:
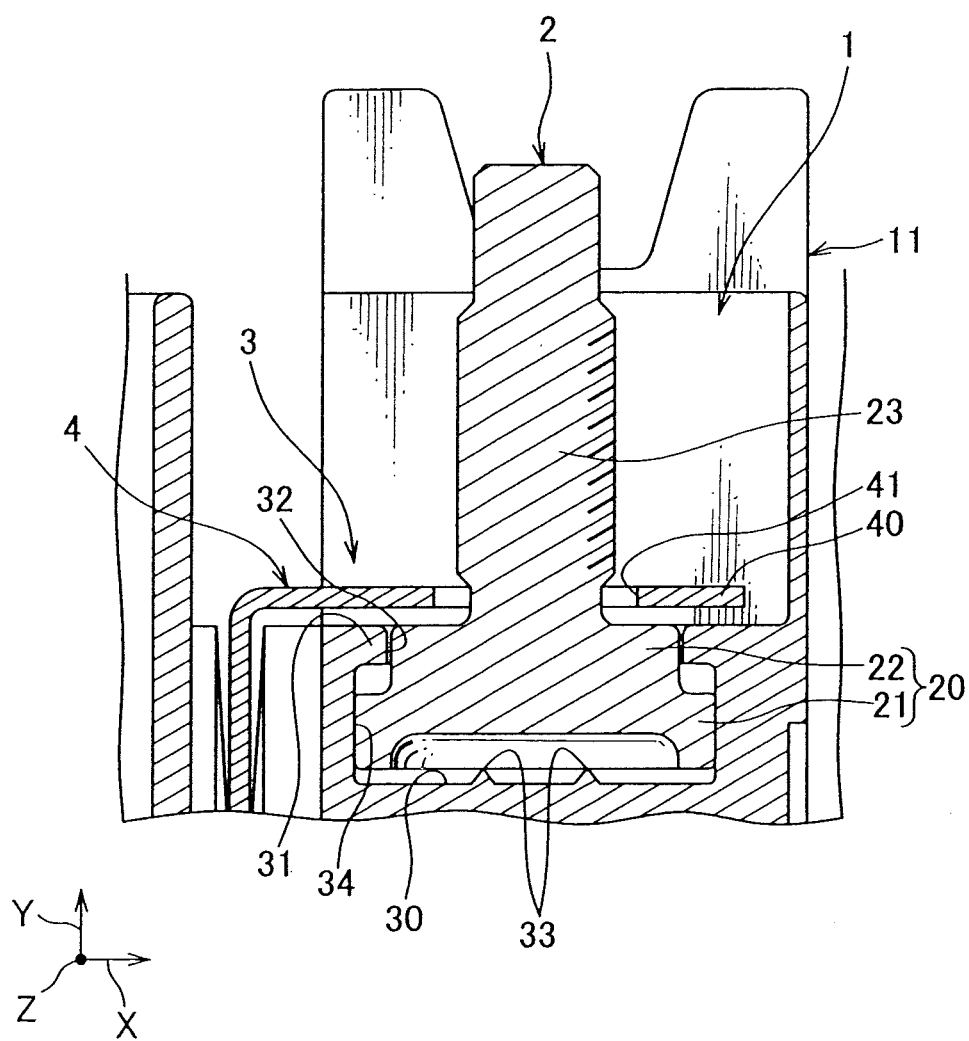
FIG. 5 is a cross-sectional view showing a bus bar being attached to a cassette block shown in FIG. 4.
Figure 6:
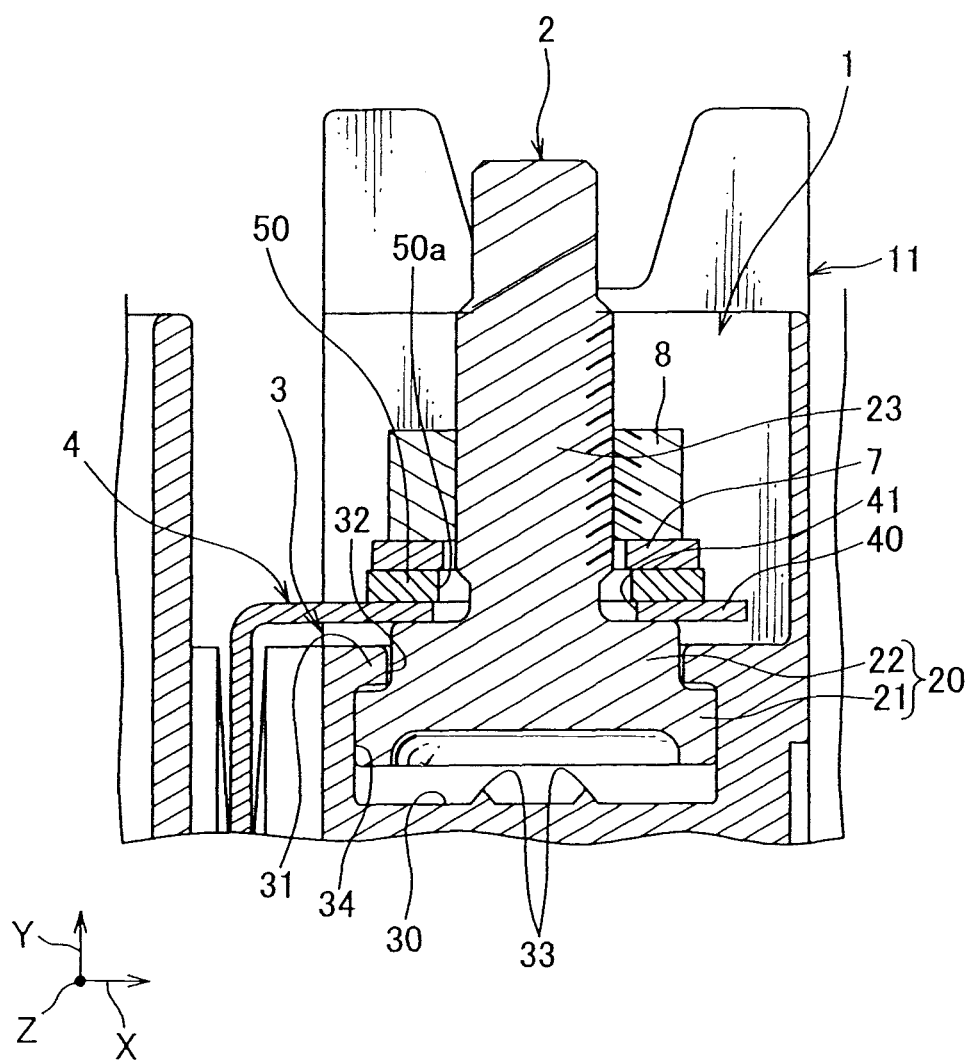
FIG. 6 is a cross-sectional view showing the bus bar of FIG. 5 being electrically connected with a terminal clamp by a bolt and a nut.
Figure 7:
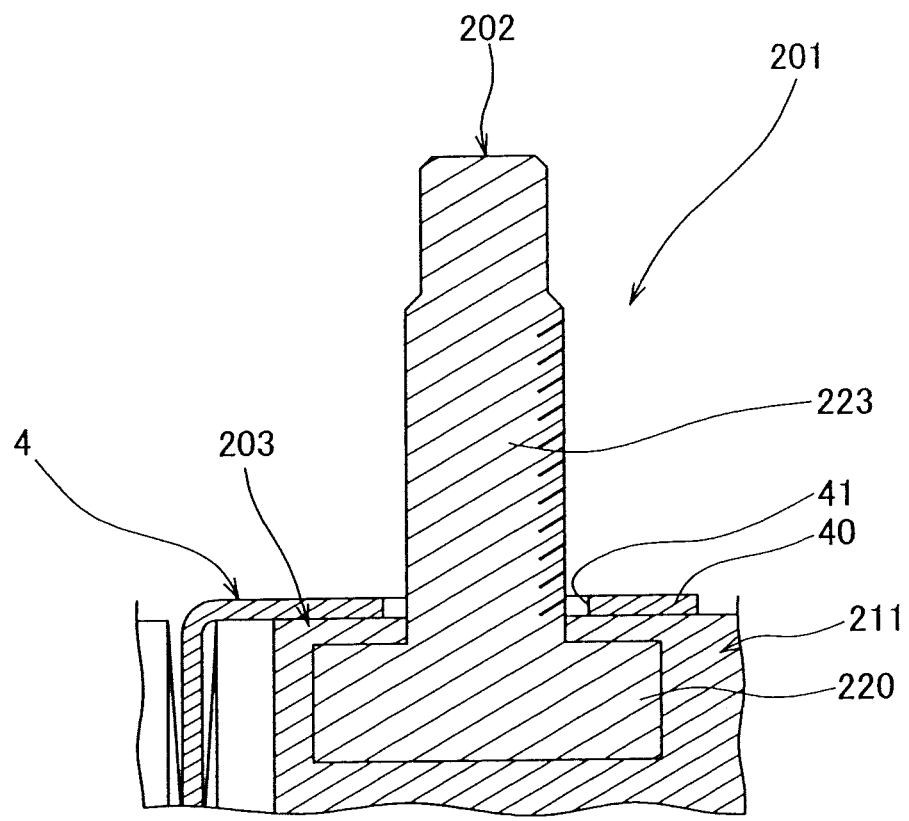
FIG. 7 is a cross-sectional view showing a conventional bolt support structure.
Figure 8:
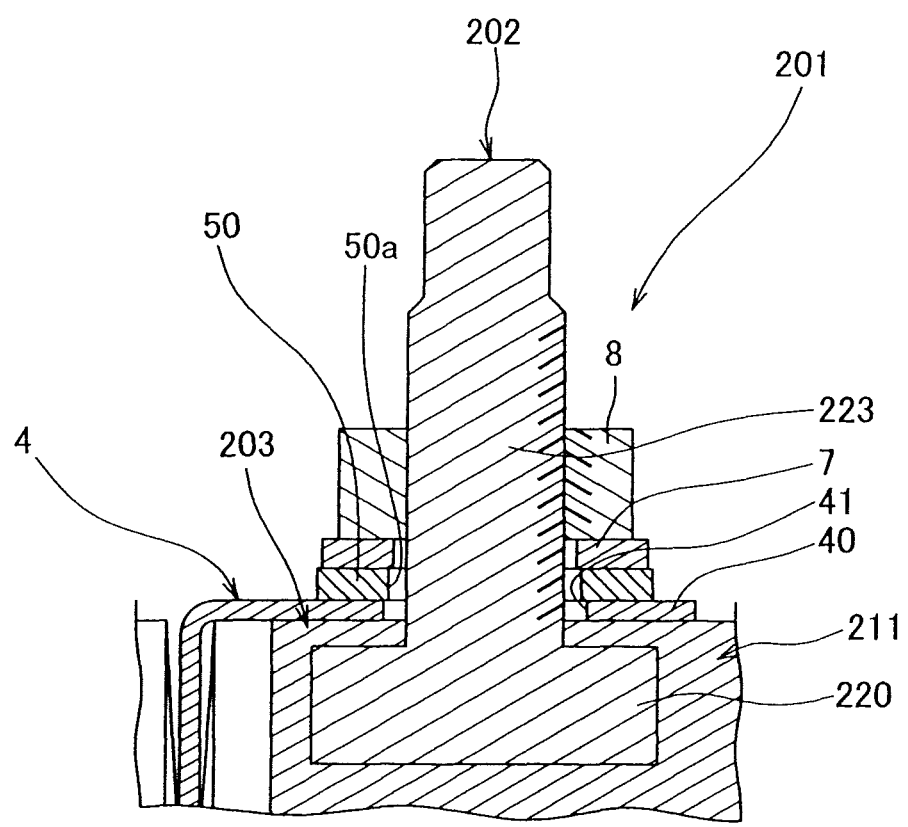
FIG. 8 is a cross-sectional view showing a bus bar of FIG. 7 being electrically connected with a terminal clamp by a bolt and a nut.
Figure 9:
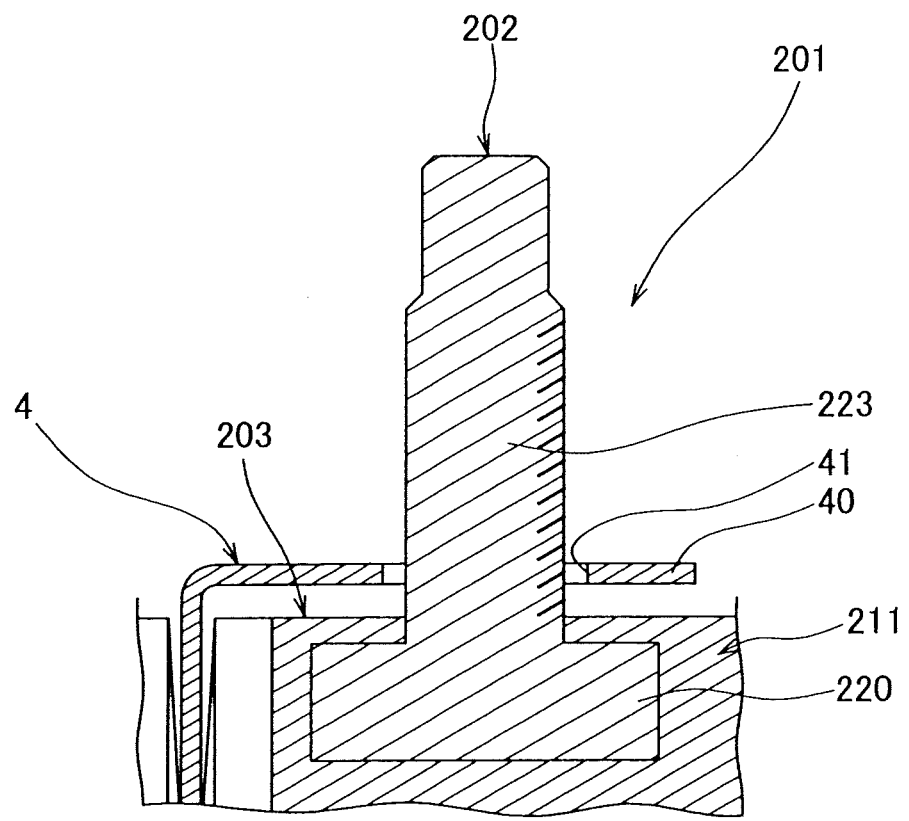
FIG. 9 is a cross-sectional view showing displacement of the bus bar of FIG. 7.
Figure 10:
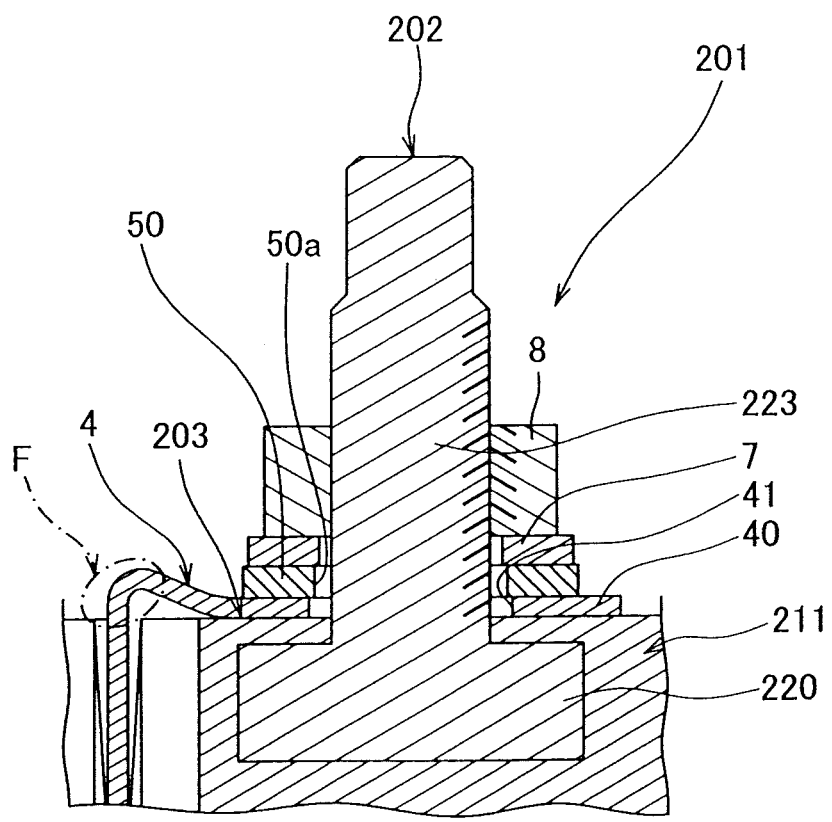
FIG. 10 is a cross-sectional view showing the bus bar of FIG. 9 being electrically connected to the terminal clamp by a bolt and a nut.

As shown in FIGS. 2 and 4, before the bus bar 4 is mounted to the cassette block 11, the bolt 2 is mounted to the mount portion 3 by sliding the bolt 2 on the bottom plate 30 in a direction indicated by an arrow B in FIG. 2 (hereinafter called the B direction), so that the bolt 2 is passed through the opening 35, passed between the pair of projections 36 and through the notch 32, and finally mounted to the mount portion 3. The bolt 2, when being passed between the pair of projections 36, temporarily forces the mount portion 3 to be deformed so as to widen the gap between the projections 36. The bolt 2 having the head portion 20 mounted to the mount portion 3 in a manner as described above is arranged to move with respect to the mount portion 3 in an axial direction of the shaft portion 23, i.e. directions indicated by an arrow E in FIG. 4. Meanwhile, the bolt 2 is prohibited from moving in a direction opposite to the B direction due to the pair of projections 36 acting as a retainer for the small-diameter portion 22. After the head portion 20 of the bolt 2 is mounted to the mount portion 3, the bus bar 4 is mounted to the cassette block 11, with the shaft portion 23 being passed through the through hole 41 of the bus bar 4.

For the electrical junction box 10 employing the bolt support structure 1 described above, first the head portion 20 of the bolt 2 is mounted to the mount portion 3, and then the shaft portion 23 is subjected to be passed through the through hole 41 of the bus bar 4, the through hole 50a of the terminal clamp 5 and the washer 7. Then, the nut 8 is attached to the shaft portion 23 to fix the connection portion 40 of the bus bar 4, the connection portion 50 of the terminal clamp 5 and the washer 7 to each other, thereby electrically connecting the bus bar 4 with the terminal clamp 5.

Furthermore, for the electrical junction box 10, the connection portion 40 of the bus bar 4 is designed to contact with the outer surface of the upper plate 31 as shown in FIG. 3; however, in practice, there is a chance that the connection portion 40 of the bus bar 4 being lifted up and separated from the outer surface of the upper plate 31.

In such case where the connection portion 40 of the bus bar 4 is separated from the outer surface of the upper plate 31, screwing of the nut 8 to the shaft portion 23 makes the bolt 2 to move in a direction indicated by an arrow Y, and the small-diameter portion 22 abuts on the connection portion 40 of the bus bar 4. Consequently, the connection portion 40 of the bus bar 4, the connection portion 50 of the terminal clamp 5 and the washer 7 are sandwiched between the small-diameter portion 22 and the nut 8, thereby electrically connecting the bus bar 4 with the terminal clamp 5.

As described above, according to the present invention, the head portion 20 of the bolt 2 is mounted to the mount portion 3 so that the head portion 20 is allowed to move in the axial direction of the shaft portion 23 with respect to the mount portion 3. Furthermore, the small-diameter portion 22 is allowed to project and retract from the outer surface of the upper plate 31 so that the upper plate 31 is not sandwiched between the small-diameter portion 22 and the nut 8. As a result, in either case where the bus bar 4 is positioned in the right position and the connection portion 40 of the bus bar 4 is in contact with the outer surface of the upper plate 31, or where there exists the displacement of the bus bar 4 causing the connection portion 40 of the bus bar 4 spaced apart from the upper plate 31, the connection portion 40 of the bus bar 4 and the connection portion 50 of the terminal clamp 5 can be fixed together between the small-diameter 22 and the nut 8 and electrically connected to each other without causing the bending of the bus bar 4.

In addition, in the present invention it is not necessary to use the washer 7 to attach the nut 8 to the bolt 2.

Furthermore, in the present invention the mount portion 3 may be provided separately from the cassette block 11 and may be attached to the cassette block 11 using adhesive, locking means or the like.

The embodiments described herein are only representative embodiments of the present invention and are not intended to limit the present invention. That is, the shown embodiments can be modified or changed in various ways without departing from the spirit and scope of the present invention.

The invention claimed is:

1. A bolt and a bus bar support structure comprising
a bolt having a head portion and a shaft portion,
a bus bar comprising an orthogonally-bent portion, and
a mount portion to which the head portion of the bolt is mounted,
wherein
after the head portion of the bolt is mounted to the mount portion, a nut is attached to the shaft portion of the bolt so as to sandwich the bus bar and a terminal clamp between the head portion of the bolt and the nut,
the head portion of the bolt and the bus bar are mounted to the mount portion such that the head portion and the bus bar are allowed to move in an axial direction of the shaft portion with respect to the mount portion,
the head portion of the bolt is composed of a large-diameter portion and a small-diameter portion,
the mount portion includes a bottom plate and an upper plate arranged to position an outer periphery portion of the large-diameter portion between the upper plate and the bottom plate,
the shaft portion and the small-diameter portion are passed through a notch formed at the upper plate of the mount portion, and
a gap between the bottom plate and the upper plate of the mount portion is formed larger than the thickness of the outer periphery portion of the large-diameter portion.

* * * * *